US010571913B2

(12) United States Patent
Lambermont et al.

(10) Patent No.: US 10,571,913 B2
(45) Date of Patent: Feb. 25, 2020

(54) OPERATION-SECURITY SYSTEM FOR AN AUTOMATED VEHICLE

(71) Applicant: Aptiv Technologies Limited, St. Michael (BB)

(72) Inventors: Serge Lambermont, Singapore (SG); Junsung Kim, Pittsburgh, PA (US); Junqing Wei, Bridgeville, PA (US); Gaurav Bhatia, Pittsburgh, PA (US)

(73) Assignee: Aptiv Technologies Limited, St. Michael (BB)

( * ) Notice: Subject to any disclaimer, the term of this patent is extended or adjusted under 35 U.S.C. 154(b) by 386 days.

(21) Appl. No.: 15/230,019

(22) Filed: Aug. 5, 2016

(65) Prior Publication Data

US 2018/0039269 A1 Feb. 8, 2018

(51) Int. Cl.
*G05D 1/00* (2006.01)
*G01S 13/86* (2006.01)
(Continued)

(52) U.S. Cl.
CPC .......... *G05D 1/0077* (2013.01); *G01S 13/865* (2013.01); *G01S 13/867* (2013.01); *G01S 13/931* (2013.01); *G05D 1/0088* (2013.01); *G05D 1/0248* (2013.01); *G05D 1/0257* (2013.01); *G08G 1/166* (2013.01); *G01S 2013/935* (2013.01); *G01S 2013/936* (2013.01);
(Continued)

(58) Field of Classification Search
CPC .... G01S 13/865; G01S 13/867; G01S 13/931; G01S 2013/9342; G01S 2013/9346; G01S 2013/935; G01S 2013/936; G05D 1/0077; G05D 1/0088; G05D 1/0248; G05D 1/0257; G05D 2201/0212; G08G 1/163
USPC .......................................................... 342/52
See application file for complete search history.

(56) References Cited

U.S. PATENT DOCUMENTS 7,512,516 B1 3/2009 Widmann
9,274,525 B1 3/2016 Ferguson
(Continued)

OTHER PUBLICATIONS

International Search Report and Written Opinion in International Application No. PCT/US2017/041831, dated Oct. 24, 2017, 16 pages.

(Continued)

*Primary Examiner* — Timothy X Pham
(74) *Attorney, Agent, or Firm* — Fish & Richardson P.C.

(57) ABSTRACT

An operation-security system for an automated vehicle includes an object-detector and a controller. The object-detector includes at least three sensors. Each sensor is one of a camera used to determine an image-location of an object proximate to a host-vehicle, a lidar-unit used to determine a lidar-location of the object proximate to the host-vehicle, and a radar-unit used to determine a radar-location of the object proximate to the host-vehicle. The controller is in communication with the at least three sensors. The controller is configured to determine a composite-location based on a comparison of locations indicated by the at least three sensors. Information from one sensor is ignored when a respective location indicated by the one sensor differs from the composite-location by greater than an error-threshold. If a remote sensor not on the host-vehicle is used, V2V or V2I communications may be used to communicate a location to the host-vehicle.

20 Claims, 2 Drawing Sheets

(51) Int. Cl.
*G01S 13/93* (2006.01)
*G01S 13/931* (2020.01)
*G05D 1/02* (2020.01)
*G08G 1/16* (2006.01)

(52) U.S. Cl.
CPC ................. *G01S 2013/9342* (2013.01); *G01S 2013/9346* (2013.01); *G05D 2201/0212* (2013.01)

(56) References Cited

U.S. PATENT DOCUMENTS

2005/0206142 A1 9/2005 Prakah-Asante et al.
2010/0100324 A1 4/2010 Caminiti
2010/0253489 A1* 10/2010 Cui ....................... G01S 13/723 340/425.5
2010/0253493 A1* 10/2010 Szczerba ............... G01S 13/723 340/435
2013/0325311 A1* 12/2013 Yoo .......................... G08G 1/16 701/301
2013/0335569 A1* 12/2013 Einecke ................ G01S 13/867 348/148
2014/0168377 A1 6/2014 Cluff et al.
2015/0032290 A1 1/2015 Kitahama et al.
2015/0123816 A1 5/2015 Breed
2015/0260498 A1* 9/2015 Soohoo ................... G01S 17/87 73/1.79
2017/0294124 A1* 10/2017 Baba .................. G06K 9/00805

OTHER PUBLICATIONS

International Preliminary Report on Patentability in International Application No. PCT/US2017/041831, dated Feb. 14, 2019, 9 pages.

European Extended Search Report in European Application No. 17837376, dated Aug. 5, 2019, 8 pages.

* cited by examiner

OPERATION-SECURITY SYSTEM FOR AN AUTOMATED VEHICLE

TECHNICAL FIELD OF INVENTION

This disclosure generally relates to a an operation-security system for an automated vehicle, and more particularly relates to selecting a sensor to ignore if there is an indication that a location of an object indicated by the sensor is in error due to the system being hacked or the sensor being spoofed.

BACKGROUND OF INVENTION

It is known to use on-vehicle and/or remote (i.e. off-vehicle) sensors (e.g. camera, radar, lidar) to detect/identify objects proximate to an automated vehicle for the purpose of navigation and/or collision avoidance. However, instances have been reported of vehicle control software and remote sensing systems being infiltrated or maliciously hacked to cause the automated vehicle to possibly operate in an erratic manner.

SUMMARY OF THE INVENTION

In accordance with one embodiment, an operation-security system for an automated vehicle is provided. The system includes an object-detector and a controller. The object-detector includes at least three sensors. Each sensor is one of a camera used to determine an image-location of an object proximate to a host-vehicle, a lidar-unit used to determine a lidar-location of the object proximate to the host-vehicle, and a radar-unit used to determine a radar-location of the object proximate to the host-vehicle. The controller is in communication with the at least three sensors. The controller is configured to determine a composite-location based on a comparison of locations indicated by the at least three sensors. Information from one sensor is ignored when a respective location indicated by the one sensor differs from the composite-location by greater than an error-threshold.

In another embodiment, an operation-security system for an automated vehicle is provided. The system includes a camera, a lidar-unit, a radar-unit, and a controller. The camera is used to determine an image-location of an object proximate to a host-vehicle. The lidar-unit is used to determine a lidar-location of the object proximate to the host-vehicle. The radar-unit is used to determine a radar-location of the object proximate to the host-vehicle. The controller is in communication with the camera, the radar-unit, and the lidar-unit. The controller is configured to determine a composite-location based on a comparison of the imager-location, the radar-location, and the lidar-location. Information from one of the camera, the radar-unit, and the lidar-unit is ignored when one of the imager-location, the radar-location, and the lidar-location differs from the composite-location by greater than an error-threshold.

In yet another embodiment, an operation-security system for an automated vehicle is provided. The system includes an object-detector and a controller. The object-detector is used to determine a first-location of an object proximate to a host-vehicle at a first-time, and a second-location of the object at a second-time characterized as a sampling-interval after the first-time. The controller is in communication with the object-detector. The controller is configured to determine a motion-vector of the host-vehicle, and estimate an expected-location of the object at the second-time based on the motion-vector, the first-location, and the sampling-interval. Information from the object-detector at the second-time is ignored when the expected-location differs from the second-location by greater than an error-threshold.

In yet another embodiment, an operation-security system for an automated vehicle is provided. The system includes an object-detector, a transceiver, and a controller. The object-detector includes an on-vehicle sensor mounted on a host-vehicle. The on-vehicle sensor is used to determine a detected-location of an object proximate to the host-vehicle. The transceiver is used to receive a reported-location of the object determined by a remote sensor not mounted on the host-vehicle. The controller is in communication with the on-vehicle sensor and the transceiver, said controller configured to compare the detected-location and the reported-location, and ignore information from the transceiver when the detected-location differs from the reported-location by greater than an error-threshold.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
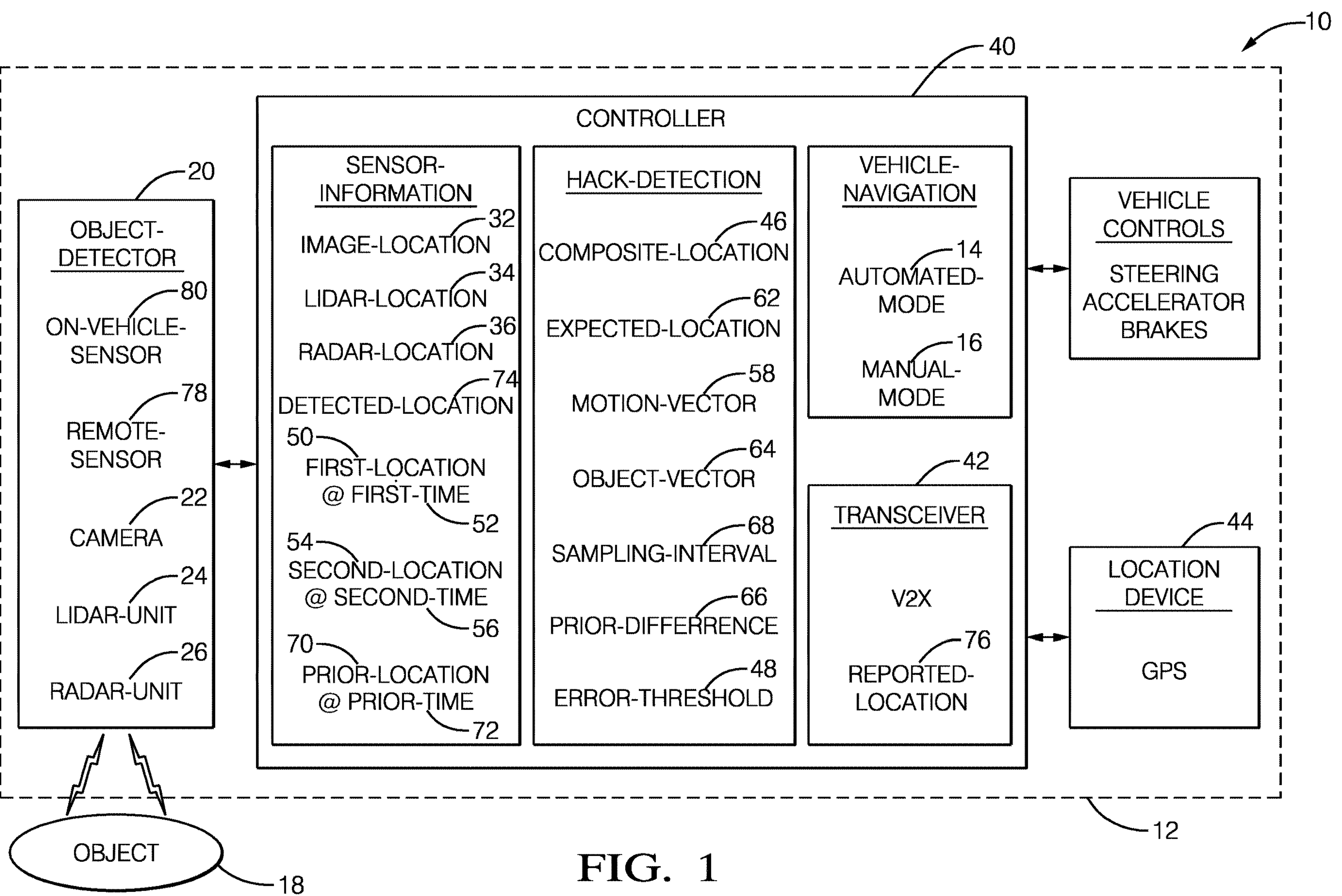
FIG. 1 is a diagram of a operation-security system in accordance with one embodiment.

FIG. 1 illustrates a non-limiting example of a sensor-control system 10, hereafter referred to as the system 10, which is suitable for use by an automated vehicle, for example a host-vehicle 12. The examples presented herein are generally directed to instances when the host-vehicle 12 is being operated in an automated-mode 14, i.e. a fully autonomous mode, where a human operator (not shown) of the host-vehicle 12 does little more than designate a destination to operate the host-vehicle 12. However, it is contemplated that the teachings presented herein are useful when the host-vehicle 12 is operated in a manual-mode 16 where the degree or level of automation may be little more than providing steering advice to the human operator who is generally in control of the steering, accelerator, and brakes of the host-vehicle 12, i.e. the system 10 assists the human operator as needed to reach the destination and/or avoid a collision with, for example an object 18 such as an other-vehicle.

Figure 2:
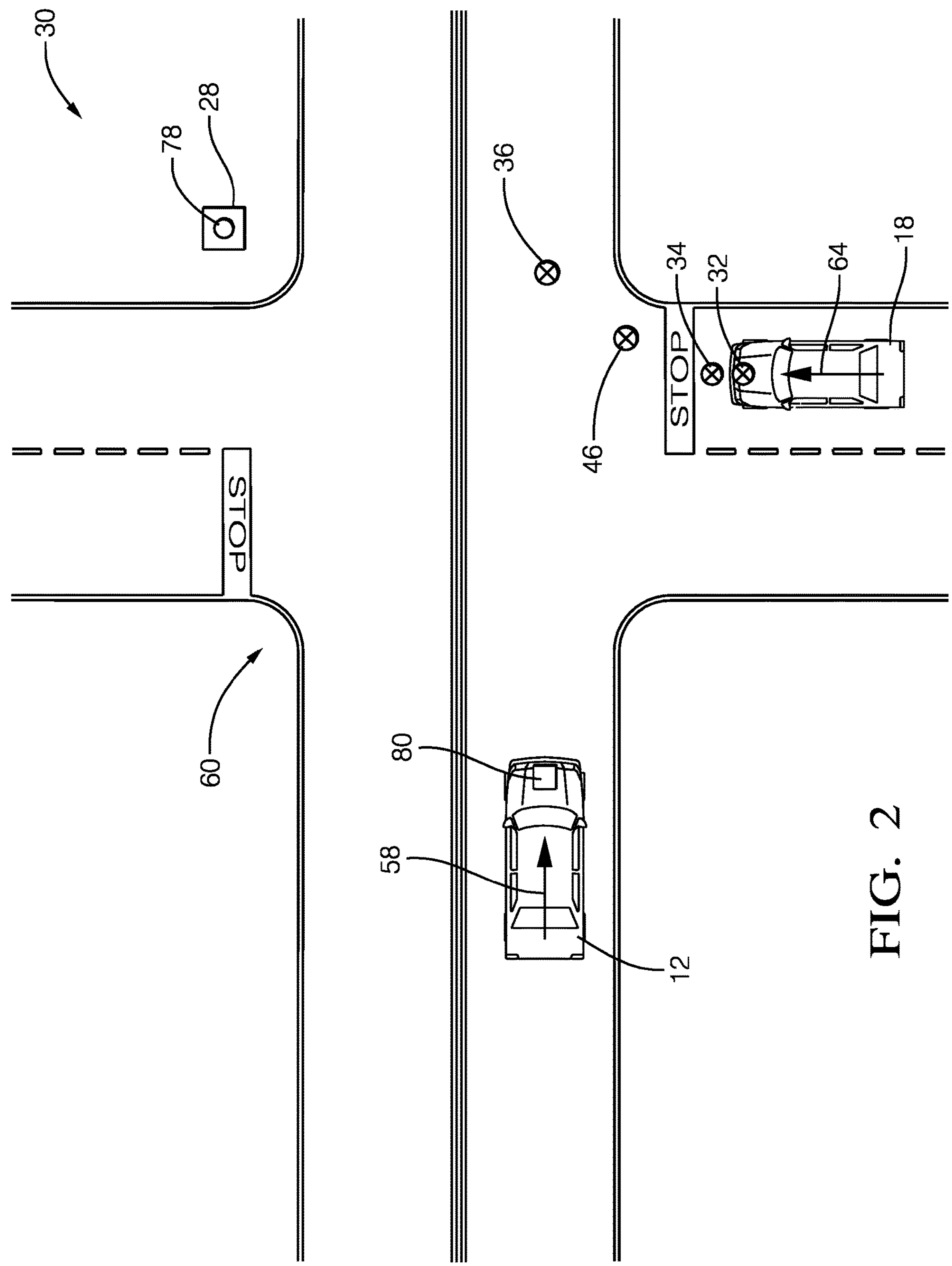
FIG. 2 is a traffic-scenario encountered by the system of FIG. 1 in accordance with one embodiment.

The system 10 includes an object-detector 20 that includes at least three sensors, which may be any combination of, but are not limited to a camera 22, a lidar-unit 24, and a radar-unit 26. That is, each sensor may be one of the options, but it is not a requirement that each sensor be a different option. The example embodiments of the system 10 described herein generally suggest that all three sensors are mounted on the host-vehicle, and one of each kind of sensor is used, e.g. one each of the camera 22, the lidar-unit 24, and the radar-unit 26 is mounted on the host-vehicle 12. While the non-limiting example shown in FIG. 2 shows all of the sensors as part of the host-vehicle, i.e. mounted on the host-vehicle, alternative embodiments are contemplated where one or more of the sensors is not mounted on the host-vehicle 12, i.e. is remote rather than on-vehicle, and where duplicates of the types of sensor are used. For example, an alternative configuration may have a camera and a lidar mounted on the host-vehicle 12, and a second camera or a second lidar located at a remote-position 28 (FIG. 2) selected so the sensor can be used to observe an intersection approached by the host-vehicle 12. It is further contemplated that the remote instance of the sensor (a remote sensor 78) may be mounted on another vehicle (not shown, a vehicle other than the other-vehicle is shown as the object 18 in FIG. 2).

FIG. 2 illustrates a non-limiting example of a traffic-scenario 30 where the various sensors are used to determine a location of the object 18, preferably a readily identifiable point on the object 18. In this example, the object is an other-vehicle, and the point is the center of the front edge or front bumper of the other-vehicle. The camera 22 is used to determine an image-location 32 of the object 18, the lidar-unit 24 is used to determine a lidar-location 34 of the object 18, and the radar-unit 26 is used to determine a radar-location 36 of the object 18. If all of the sensors are mounted on the host-vehicle 12, the various locations may be specified in terms of range or distance and direction (e.g. azimuth angle and/or elevation angle) from the host-vehicle 12 to the object 18. Alternatively, the various locations may be specified in world coordinates, e.g. latitude, longitude, and elevation. Using world coordinates may be preferable if one or more of the sensors is located remote from the host-vehicle 12 rather than mounted on the host-vehicle.

That the radar-location 36 is shown as apparently being in error (i.e. well-spaced apart from the object 18 and corresponding instances of the image-location 32 and the lidar-location 34) is done to illustrate the improvement provided by the system 10 described herein. As noted above, instances have been reported of vehicle control software and remote sensing systems being infiltrated or maliciously hacked to cause the host-vehicle 12 to possibly operate in an erratic manner. In this example, because the radar-location 36 is so different or distant from the image-location 32 and the lidar-location 34 suggests that the system 10 may have been hacked, or the radar-signal used to determine the radar-location 36 may have been jammed or spoofed to cause the error. By way of further example, if the radar-unit 26 is mounted at the remote-position 28, the radar-unit 26 may have been tampered with or the communication between the radar-unit 26 and the host-vehicle may have been hacked or spoofed. As will be described in more detail below, the system 10 is configured to detect or determine when the system 10 has been hacked or is being spoofed, and take action to avoid erratic operation of the host-vehicle 12.

Returning to FIG. 1, the system 10 includes a controller 40 in communication with the (at least) three sensors, whatever combination of sensors that may be. The communication may be by way of, but not limited to, wires, wireless-communication, or optical-fiber as will be recognized by those in the art. If the sensor is a remote sensor 78, i.e. not on-vehicle, communications may be by way of vehicle-to-infrastructure (V2I) communications, vehicle-to-vehicle (V2V) communications, and/or vehicle-to-pedestrian (V2P) communications, which may be generically labeled as V2X communications. Accordingly, the system 10 may include a transceiver 42 to enable such communications.

The controller 40 may include a processor (not specifically shown) such as a microprocessor or other control circuitry such as analog and/or digital control circuitry including an application specific integrated circuit (ASIC) for processing data as should be evident to those in the art. The controller 40 may include memory (not specifically shown), including non-volatile memory, such as electrically erasable programmable read-only memory (EEPROM) for storing one or more routines, thresholds, and captured data. The one or more routines may be executed by the processor to perform steps for determining if any of the locations indicated by the various sensors suggest that the system 10 has been hacked or is being spoofed.

If any or all of the locations (e.g.—the image-location 32, the lidar-location 34, or the radar-location 36) are expressed in world coordinates, the system 10 may include a location-device 44 such as a global-position-system (GPS) receiver, whereby a map-location on a digital-map may be determined. Alternatively, whereby the map-location of the host-vehicle 12 may be determined based on the location of the host-vehicle 12 relative to various permanent objects such as road-signs, buildings, etc., as will be recognized by those in the art.

In order for the system 10 to detect or determine that the system 10 has been hacked or is in some way being spoofed, the controller 40 configured to determine a composite-location 46 based on a comparison of locations, e.g.—the image-location 32, the lidar-location 34, and the radar-location 36, indicated by the at least three sensors, e.g. the camera 22, the lidar-unit 24, and the radar-unit 26. By way of example and not limitation, the composite-location 46 may be determined by calculating an average range or distance and an average azimuth angle from the host-vehicle 12 to each of the locations (32, 34, and 36). Alternatively, the composite-location 46 may be determined based on an average of the latitudes and longitudes of each location if the locations are expressed in world coordinates.

The averaging may be un-weighted, or may be weighted to, for example, give the two locations that are closest to each other more emphasis or weight relative to the outlier e.g. the radar-location 36 in FIG. 2. Alternatively, it may be advantageous to give more weight to locations determined by on-board sensors over remote sensors as a remote sensor 78 is thought to be more easily hacked or spoofed than on-board sensors. This is not meant to suggest that the controller 40 is immune from being hacked or spoofed.

The controller 40 may be further configured to ignore location information from the one sensor that appear to be the most erroneous (the radar-unit 26 in this example) when a respective location (the radar-location 36 in this example) of the one sensor differs from the composite-location 46 by greater than an error-threshold 48, e.g. a half-meter (0.5 m) for example. In other words, if the distance between the composite-location 46 and any of the locations is greater than the error-threshold 48, that erroneous location may be ignored and presumed to be in error due to, for example, hacking or spoofing. It is recognized that a sensor may become out-of-specification or otherwise damaged, which could also be the reason that a location reported by a sensor appears to be so at odds with locations reported by other sensors. Nevertheless, it is likely preferable that the location information from the sensor in question be ignored.

If more than one location differs from the composite-location 46 by more than the error-threshold 48, it is contemplated that only the sensor that reports a location that is the most distant from the composite-location 46 will be ignored. It is also contemplated that once the decision is made to ignore the most erroneous sensor, the composite-location 46 maybe recalculated to improve the overall accuracy of determining the actual locations of the object 18 relative to the host-vehicle 12.

The description of the system 10 provided above generally evaluates location information from multiple sensors taken or gathered at about the same instant in time, for example within one-tenth second (0.1 s) of each other. However, it is contemplated that hacking, spoofing, or a sudden failure of a sensor could also be detected by monitoring the location information over time and looking for sudden, unusual, or unexpected changes in the location information. For example, the object-detector 20 may be used to determine a first-location 50 of the object 18 that is proximate to a host-vehicle at a first-time 52, and a second-location 54 of the object 18 a second-time 56 a sampling-interval 68 after or later than the first-time 52, where a suitable value for the sampling-interval 68 is two-tenths of a second (0.2 s). The first-location 50 and the second-location 54 may be based on location information from a single sensor, i.e. information from individual sensors is being monitored over a period of time. Alternatively, or in addition to monitoring of individual sensors, the composite-location 46 at the first-time 52 may be used as the first-location 50, and the composite-location 46 at the second-time 56 may be as the second-location 54, and analyzed to detect sudden or unexpected changes in the location information.

FIG. 2 suggests that the host-vehicle 12 is moving or traveling toward an intersection 60 while the other-vehicle that is the object 18 waits to enter the intersection 60. The controller 40, which is in communication with the object-detector 20, may be further configured to determine a motion-vector 58 of the host-vehicle 12. The motion-vector 58 may be an actual vector based on, for example, an indicated speed, and yaw-rate from the host-vehicle 12. Alternatively, the motion-vector 58 may be based on speed and a direction or heading determined from the location-device 44. The controller 40 may be further configured to estimate an expected-location 62 of the object 18 at the second-time 56 based on the motion-vector 58, the first-location 50, and the sampling-interval 68. That is, as the host-vehicle 12 travels toward the object 18, it is expected that the location of the object 18 relative to the host-vehicle 12 will change because the host-vehicle 12 is moving, but the change can be predicted based on the motion-vector 58. However, if the expected-location 62 does not correspond well with the second-location 54 indicated by the object-detector 20 at the second-time 56, then that may be an indication that the system 10 has been hacked or is being spoofed. Accordingly, information from the object-detector 20 at the second-time may be ignored when expected-location 62 differs from the second-location 54 by greater than an error-threshold 48. Of course, this presumes that at some time prior to the second-time 56 there was no hacking or spoofing of the system 10.

FIG. 2 may be interpreted to suggest that the other-vehicle indicated as the object 18 is not moving because of the stop sign at the intersection 60. However, if the object 18 is moving, e.g. approaching but slowing to a stop at the intersection 60, the controller 40 may be further configured to determine an object-vector 64 based on a prior-difference 66 between the first-location 50 and a prior-location 70 of the object 18 proximate to the host-vehicle at a prior-time 72 prior to the first-time 52. The expected-location 62 may also be determined based on the object-vector. That is, both the motion-vector 58 of the host-vehicle 12 and the object-vector 64 of the object 18 may be used to determine the expected-location 62 of the object 18 to cover instances when the object 18 is moving rather than stationary.

As suggested above, the system may include the transceiver 42 to support V2X communications from sensors that are remote, i.e. not mounted on the host-vehicle 12. In order to detect instances when a remote sensor 78 is hacked or spoofed, or the V2X communications is hacked or spoofed, the locations provided by one or more instances of an on-vehicle sensor 80 that make up the object-detector 20 that are mounted on a host-vehicle 12 may be used to determine a detected-location 74 of an object proximate to the host-vehicle 12. That is, the composite-location 46 mentioned above may include locations that are not strictly determined by the on-vehicle sensor 80 mounted on the host-vehicle 12, while the determination of the detected-location 74 is limited to using only the one or more instances of on-vehicle sensor 80 that are actually mounted on the host-vehicle 12. In contrast, the transceiver 42 may be used to receive a reported-location 76 of the object 18 determined by a remote sensor 78 not mounted on the host-vehicle 12.

The controller 40, which is in communication with one or more instances of the on-vehicle sensor 80 of the object-detector 20 and the transceiver 42, may be further configured to compare the detected-location 74 and the reported-location 76, and ignore information from the transceiver 42 when the detected-location 74 differs from the reported-location 76 by greater than the error-threshold 48. There is a presumption that the host-vehicle 12, or more specifically the controller 40, has not been hacked.

Accordingly, an operation-security system (the system 10), a controller 40 for the system 10, and a method of operating the system 10 is provided. Various ways to detect or determine that a sensor, or information from the sensor, or data regarding the location of an object 18 indicated by the sensor, should not be trusted or used to control the operation of the host-vehicle 12.

While this invention has been described in terms of the preferred embodiments thereof, it is not intended to be so limited, but rather only to the extent set forth in the claims that follow.

We claim:

1. An operation security system for a vehicle, the system comprising:

at least three sensors configured to detect a first set of indicated locations, wherein each sensor is one of:
- a camera used to determine an image location of an object proximate to the vehicle,
- a lidar unit used to determine a lidar location of the object proximate to the vehicle, and
- a radar unit used to determine a radar location of the object proximate to the vehicle; and a controller-circuit in communication with the at least three sensors, the controller-circuit configured to determine a first predicted location, the first predicted location being based on the first set of indicated locations, wherein the controller-circuit is further configured to determine that at least one indicated location in the first set of indicated locations is erroneous when the at least one indicated location differs from the first predicted location by greater than an error threshold.

2. The operation security system of claim 1, further comprising an object detector mounted on the vehicle, wherein the object detector includes the at least three sensors.

3. The operation security system of claim 1, wherein the first predicted location is a composite location, the composite location being based on at least one of an average range from the vehicle to the indicated locations in the first set of indicated locations, an average azimuth angle from the vehicle to the indicated locations in the first set of indicated locations, an average latitude of the indicated locations in the first set of indicated locations, or an average longitude of the indicated locations in the first set of indicated locations.

4. The operation security system of claim 1, wherein the at least three sensors include at least one remote sensor not mounted on or within the vehicle.

5. The operation security system of claim 4, further comprising a transceiver configured to receive at least one indicated location of the object from the at least one remote sensor.

6. The operation security system of claim 1, wherein the at least three sensors comprise:

a camera used to determine an image location of an object proximate to the vehicle;

a lidar unit used to determine a lidar location of the object proximate to the vehicle; and a radar unit used to determine a radar location of the object proximate to the vehicle.

7. The operation security system of claim 1, wherein the first set of indicated locations and the first predicted location are determined at a first time, each of the at least three sensors are further configured to determine a subsequent set of indicated locations of the object at a subsequent time characterized as a sampling interval after the first time, and the controller-circuit is further configured to determine a subsequent predicted location based on the subsequent set of indicated locations.

8. The operation security system of claim 7, wherein the controller-circuit is further configured to determine a motion vector of the vehicle and determine an expected location of the object at the subsequent time based on the motion vector, the first predicted location, and the sampling interval, wherein the controller-circuit determines that at least one indicated location in the subsequent set of indicated locations is erroneous when the at least one indicated location of the subsequent set of indicated locations differs from the expected location by greater than an error threshold.

9. The operation security system of claim 8, wherein the motion vector is based on a yaw rate.

10. The operation security system of claim 8, wherein the controller-circuit is further configured to determine an object vector based on a prior difference between the first predicted location and a prior predicted location of the object proximate to the vehicle at a prior time prior to the first time, wherein the expected location is also determined based on the object vector.

11. A method, comprising:

detecting, by at least three sensors, a first set of indicated locations, wherein each sensor is one of:

a camera used to determine an image location of an object proximate to a vehicle, a lidar unit used to determine a lidar location of the object proximate to the vehicle, and a radar unit used to determine a radar location of the object proximate to the vehicle; and determining, by a controller-circuit in communication with the at least three sensors, a first predicted location based on the first set of indicated locations; and determining, by the controller-circuit, that at least one indicated location in the first set of indicated locations is erroneous when the at least one indicated location differs from the first predicted location by greater than an error threshold.

12. The method of claim 11, further comprising an object detector mounted on the vehicle, wherein the object detector includes the at least three sensors.

13. The method of claim 11, wherein determining the first predicted location includes determining a composite location based on at least one of an average range from the vehicle to the indicated locations in the first set of indicated locations, an average azimuth angle from the vehicle to the indicated locations in the first set of indicated locations, an average latitude of the indicated locations in the first set of indicated locations, or an average longitude of the indicated locations in the first set of indicated locations.

14. The method of claim 11, wherein the at least three sensors include at least one remote sensor not mounted on or within the vehicle.

15. The method of claim 14, further comprising receiving, by a transceiver, at least one indicated location of the object from the at least one remote sensor.

16. The method of claim 11, wherein the at least three sensors comprise:

a camera used to determine an image location of an object proximate to the vehicle;

a lidar unit used to determine a lidar location of the object proximate to the vehicle; and a radar unit used to determine a radar location of the object proximate to the vehicle.

17. The method of claim 11, wherein the first set of indicated locations and the first predicted location are determined at a first time, the method further comprising:

determining, by the at least three sensors, a subsequent set of indicated locations of the object at a subsequent time characterized as a sampling interval after the first time, and determining, by the controller-circuit, a subsequent predicted location based on the subsequent set of indicated locations.

18. The method of claim 17, further comprising:

determining, by the controller-circuit, a motion vector of the vehicle, determining, by the controller-circuit, an expected location of the object at the subsequent time based on the motion vector, the first predicted location, and the sampling interval, and determining, by the controller-circuit, that at least one indicated location in the subsequent set of indicated locations is erroneous when the at least one indicated location of the subsequent set of indicated locations differs from the expected location by greater than an error threshold.

19. The method of claim 18, wherein the motion vector is based on a yaw rate.

20. The method of claim 18, further comprising determining, by the controller-circuit, an object vector based on a prior difference between the first predicted location and a prior predicted location of the object proximate to the vehicle at a prior time prior to the first time, wherein the expected location is also determined based on the object vector.

* * * * *